United States Patent [19]
Sands

[11] 3,713,345
[45] Jan. 30, 1973

[54] MECHANICAL TIMER FAIL-SAFE MECHANISM

[75] Inventor: Timothy B. Sands, Acton, Mass.

[73] Assignee: Sanders Associates, Inc., Nashua, N.H.

[22] Filed: Nov. 1, 1971

[21] Appl. No.: 194,214

[52] U.S. Cl. .................................74/1.5, 102/84
[51] Int. Cl. .............................................G04b 15/00
[58] Field of Search ..............74/1.5; 102/82, 83, 84; 185/DIG. 1

[56] References Cited

UNITED STATES PATENTS 3,677,101  7/1972  Blitz ..........................................74/1.5

Primary Examiner—Milton Kaufman
Attorney—Louis Etlinger

[57] ABSTRACT

A fail-safe mechanical timer mechanism is provided having a spring connection between the main spring input and the driving gear such that the relative positions of the drive spring end and the driving gear are maintained as a function of the escape mechanism retarding torque. A lockup feature is provided when the proper relationship between driving torque and escapement energy dissipation rate does not exist.

7 Claims, 4 Drawing Figures

MECHANICAL TIMER FAIL-SAFE MECHANISM

Background of the Invention

In many fuze arming systems, a mechanical timer is provided to insure that the arming is not completed until the device to be armed has traveled a safe distance from the launch site. The timing mechanism generally includes gear trains which are driven by a spring. The speed of rotation of the gear trains is generally retarded by some type of mechanism, such as an escapement, to provide the desired delay time. Defects in the escapement train manifested by, for example, broken gear shafts, gears with stripped teeth, gears which are misaligned, and therefore not meshing properly, or by some defect of the escapement mechanism, will disconnect the escapement speed retarding mechanism and allow the input power source to rotate the timer output shaft at high speed causing the timer to function early. Early timer functioning can be disastrous because premature arming of the fuze will allow fuze detonation prior to achieving a safe separation distance from the launch site.

The prior art has attempted to prevent such failures from causing early functioning by using a centrifugal brake to prevent instantaneous rundown and timeout. These devices are inadequate in that timeout can still occur prematurely.

Summary of the Invention

Accordingly, it is an object of this invention to provide a truly fail-safe mechanical timer wherein any failure in the timing mechanism will result in failure to achieve timeout.

It is another object of this invention to provide a mechanical timer that will not provide timeout in the event of failure.

It is a further object of this invention to provide a mechanical timer mechanism that prevents timeout in the event the retarding torque of the escapement is removed.

Briefly, a fail-safe mechanical timer mechanism is provided wherein the power input is applied to a first disc having a radial notch therein. Said first disc is coupled by a spring connection to a drive gear having a second disc attached thereto, said second disc also having a radial notch therein such that an output is obtained only when said notches are aligned. The spring connection is made such that said notches are aligned only when the timer speed retarding mechanism is functioning properly.

Brief Description of the Drawings

The above-mentioned and other features and objects of this invention will become more apparent by reference to the following description taken in conjunction with the accompanying drawings, in which.

Description of Preferred Embodiment

Figure 1:
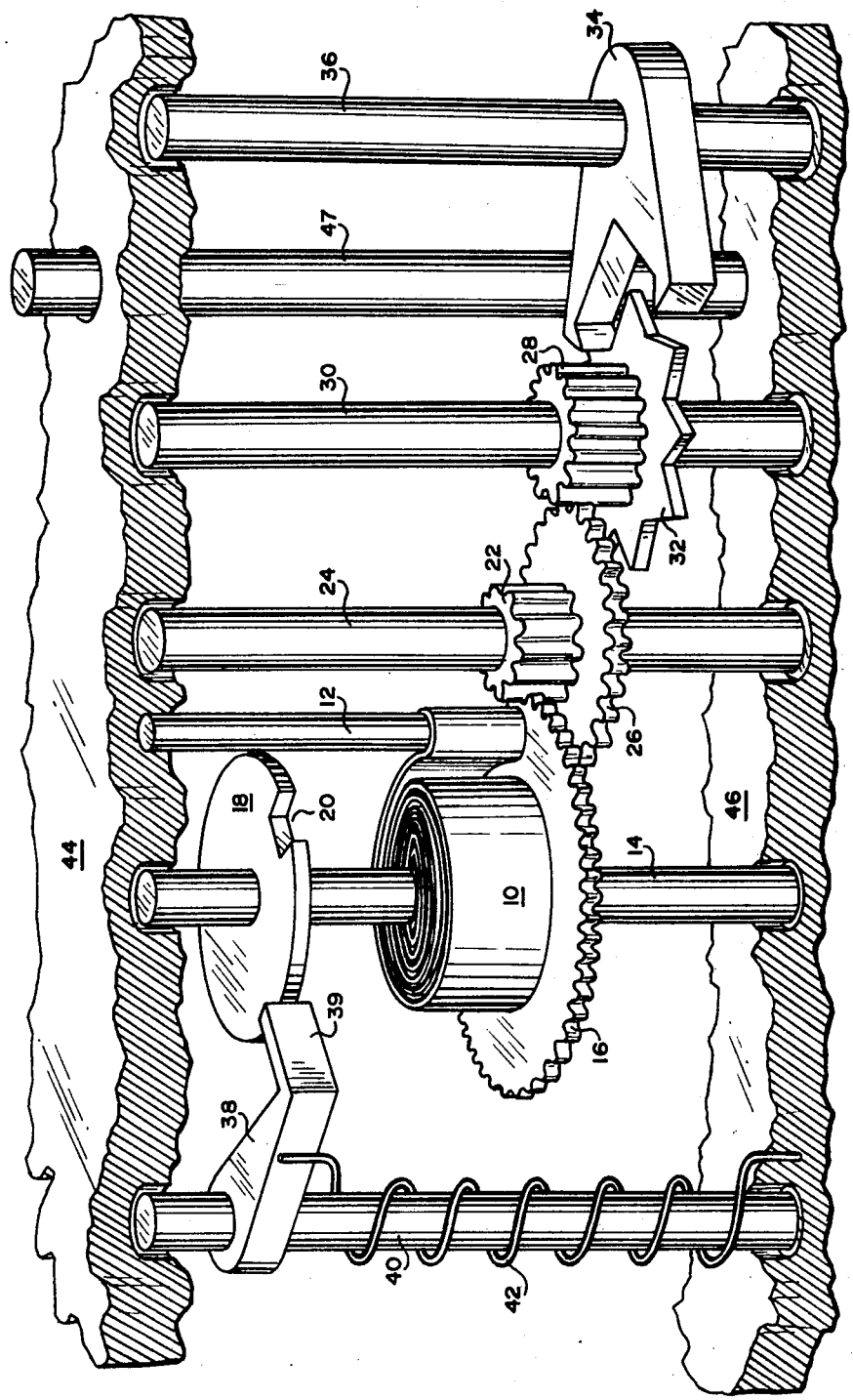
FIG. 1 is a perspective representation of a timer mechanism having no fail-safe provisions.

FIG. 1 is a perspective view of a timer mechanism structured according to the prior art and comprises a main spring 10 coupled to a main spring mounting post 12. Main spring 10 is wound about a timing shaft 14. Spring 10 is preferably wound before assembly, however, conventional winding means may be provided to wind same after assembly. Also arranged on timing shaft 14 is a drive gear 16 and a timing disc 18 having a notch 20 therein.

Drive gear 16 is coupled to a gear 22 arranged on a first stage pinion gear shaft 24, having a gear 26 also arranged thereon. Gear 26 meshes with a gear 28 on a second stage pinion-star wheel shaft 30. A star wheel 32 is also coupled to shaft 30 and mates with a verge 34 arranged on a shaft 36.

An output arm 38 coupled to a shaft 40, which is spring loaded by a torsion spring 42, is arranged adjacent timing disc 18 and will move therefrom only when timing disc 18 rotates a sufficient amount such that the free end or dog 39 of the output arm will enter notch 20.

The elements of the timer are arranged between a pair of escapement mounting plates 44 and 46.

When a locking force is removed from the drive train by pulling a release pin 47, main spring 10 begins to unwind, causing rotation of the shaft 14 and, therefore, timing disc 18 and drive gear 16. This motion is transmitted through drive gear 16 to the first stage pinion gear shaft 24 and its gears 22 and 26, and to second stage shaft 30 and its gear 28 and star wheel 32 in the form of rotation at higher and higher rates.

The rate at which shaft 30 and, therefore, shaft 24 and shaft 14, drive gear 16 and timing disc 18 is allowed to rotate, is governed by the geometry of the escape wheel 32 on shaft 30 and the verge 34 and by the moment of inertia of verge 34.

When timing disc 18 has rotated to the point where the notch 20 in its rim engages the dog 39 on the output arm 38, output shaft 40 is allowed to rotate providing an output function. The output is normally taken off of shaft 40 although not shown for clarity sake.

This arrangement is illustrated only for explanation purposes. The timing range capability is normally changed by varying the number of stages of gearing and the relationship of the notch 20 in timing disc 18 with respect to the dog 39 on output arm 38.

In this arrangement it is readily apparent that any failure which causes discontinuity of the gear train will result in immediate timeout. Furthermore, any condition which will cause a rotation rate substantially higher or lower than designed will also permit an output.

Figure 2A:
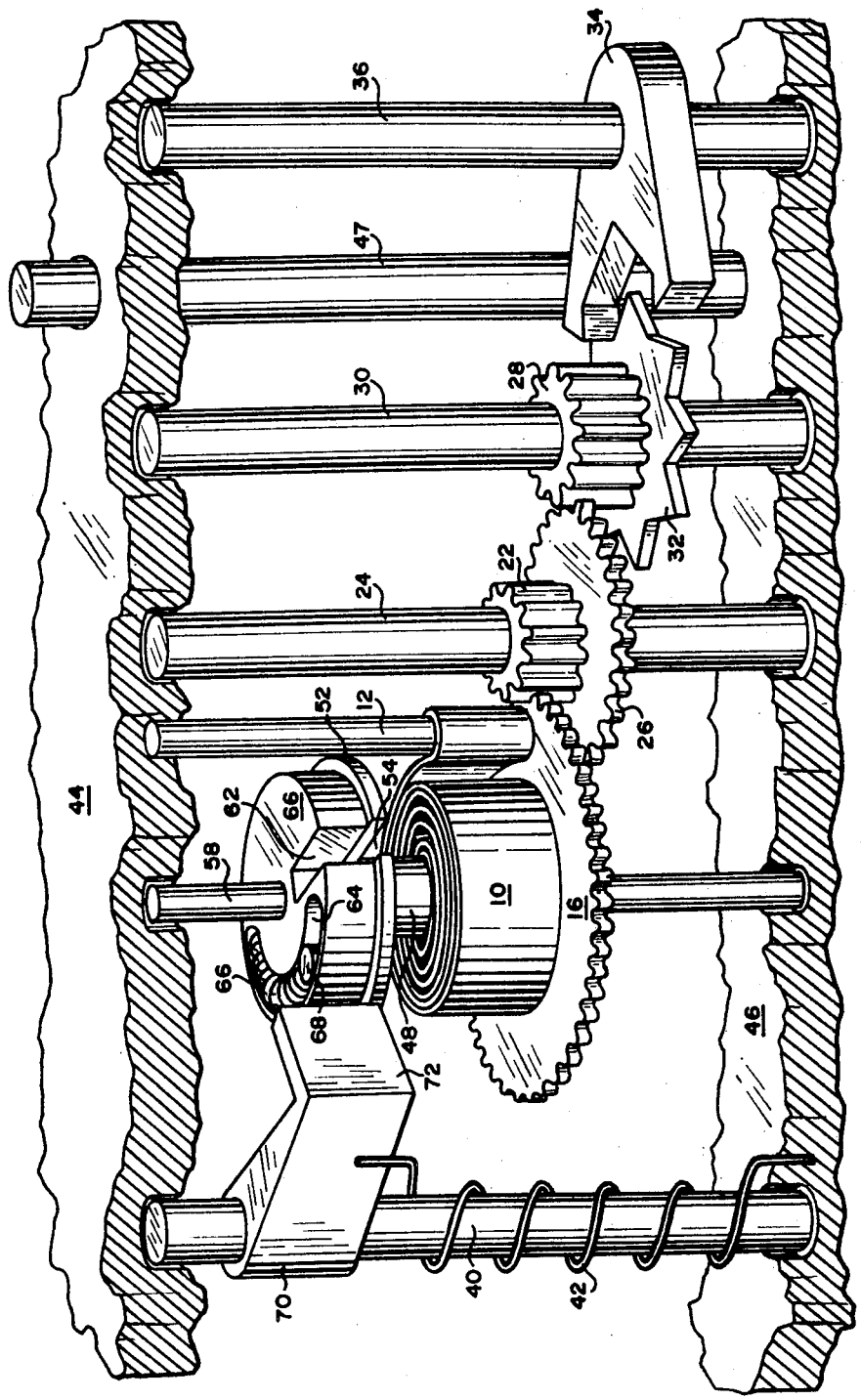
FIG. 2A is a perspective representation of a timer mechanism having a fail-safe feature.
Figure 2B:
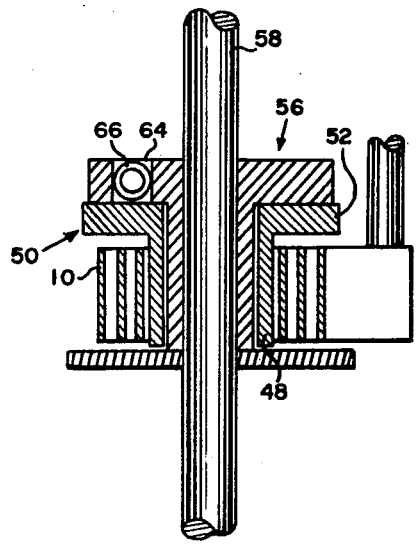
FIG. 2B is a partial section of the timing shaft of FIG. 2A.

The disadvantages of the arrangement of FIG. 1 are cured by providing the mechanism shown in FIGS. 2A and 2B. FIG. 2A illustrates a perspective view of an embodiment of a timer mechanism according to the invention, and FIG. 2B illustrates a partial section of that embodiment showing in detail the added features which make the timer fail-safe.

The timer fail-safe mechanism comprises a main spring 10 coupled to a main spring mounting post 12. Main spring 10 is wound about the hub portion 48 of a timing member 50. Timing member 50 has a disc portion 52 with a notch 54 therein. Timing member 50 is rotatably arranged about a safing member 56 which is fixed to a timing shaft 58. Safing member 56 has a disc portion 60 with a radial notch 62 and circumferential slot 64 therein. A spring 66 is arranged in slot 64. Spring 66 has a spring rate determined by the main spring and geometry of the pin and center shaft so as to maintain alignment between notches 54 and 62 when the escapement is functioning normally.

Timing disc 52 has a timing pin 68 fixed to the upper surface thereof and pin 68 rides in slot 64. The outside diameter of disc 52 is larger than the outside diameter of disc 60.

A drive gear 16 is also fixed to shaft 58. Alternatively, the gear 16 may be fastened to member 56 and both members rotatably coupled to shaft 58 which would then be non-rotatable. In this instance snap rings would be placed above and below the assembly on shaft 58 to preclude longitudinal movement of the assembly.

Drive gear 16 mates with a gear 22 arranged on a first stage pinion gear shaft 24, having a gear 26 also arranged thereon. Gear 26 meshes with a gear 28 on a second stage pinion-star wheel shaft 30. A star wheel 32 is also coupled to shaft 30 and mates with a verge 34 arranged on a shaft 36.

An output arm 70 coupled to a shaft 40, which is spring loaded by a torsion spring 42, is arranged adjacent timing disc 52 and will move therefrom only when timing disc 52 and safing disc 60 rotate a sufficient amount such that the free end 72 of the output arm will enter notches 54 and 62.

The elements of the timer mechanism are arranged between a pair of escapement mounting plates 44 and 46.

When a locking force is removed from the drive train by pulling release pin 47, main spring 10 tends to unwind, causing rotation of timing member 50. Timing member 50 drives safing member 56 and drive gear 16, which is attached thereto, through pin 68 and spring 66. This rotation is transmitted through drive gear 16 to the first stage pinion gear shaft 24 and its gears 22 and 26, and to second stage shaft 30 and its gear 28 and star wheel 32 in the form of rotation at higher and higher rates.

The rate at which shaft 30 and, therefore, shaft 24 and shaft 58 is allowed to rotate, is governed by the geometry of the escape wheel 32 on shaft 30 and the verge 34, and by the moment of inertia of verge 34.

As long as the escapement provides a normal retarding torque spring 66 is sufficiently compressed such that the notches 54 and 62 in the timing and safing discs, respectively, are aligned. Therefore, when the discs 52 and 60 have rotated to the point where the notches 54 and 62 in their rims engage the dog 72 on the output arm 70, timeout occurs and output shaft 42 is allowed to rotate providing an output function.

In the event the retarding torque imposed by the escapement is reduced which can occur if, for example, springs 10 or 66 break, or spring 66 is of the wrong value, or if the escapement train is interrupted, then the spring force equilibrium will be disturbed such that the notches 54 and 62 in discs 52 and 60 will misalign thereby precluding an output.

It is thus seen that with only minor modifications of conventional timing mechanisms fail-safe provisions are achieved. The invention works with both tuned and untuned escapements and can be employed with any variety of presently used output mechanisms.

Basically, this invention utilizes measurement of the escapement retarding torque as a means of determining desirable or undesirable timer operation. Since the escapement portion of the timer provides a predictable average retarding torque (proportional to a predetermined input torque less frictional and output mechanism forces) during normal operation continuous measurement of the actual retarding torque will provide an indication of proper timer function. Comparison of the actual torque with torque under normal operating conditions can then be used as the means of slowing or precluding an output from the timer.

Figure 3:
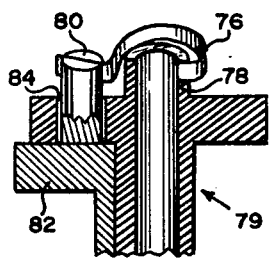
FIG. 3 is a partial section of an alternate embodiment of a spring connection.

With this device installed as in FIGS. 2A and 2B, removal of the escapement retarding torque will allow the timing disc to rotate immediately to the output position. However, the safing disc will rotate so as to preclude an output. It is to be noted that the safing disc is slightly smaller in diameter than the timing disc so that any loading of the output shaft will be transmitted only to the timing disc and will not interfere with measurement of the escapement retarding torque. Other embodiments of this principle of safing could be formulated using flat and round leafsprings, torsion springs, and tension springs in place of the compression spring. For example, a tension spring can be inserted to the right of pin 68 in place of spring 66. FIG. 3 illustrates another arrangement.

An additional feature of this invention lies in the ability of the mechanism to be locked in the unoperated position by applying the restraint to the timing disc such that the safing disc automatically rotates to prevent an output. This feature is particularly desirable under conditions of storage where corrosion could conceivably cause the timing and safing discs to jam together. In such a case no output would be obtained.

An alternate embodiment is shown in section in FIG. 3. In this embodiment a spring 76 is coupled to a hub 78 on a safing member 79 and to a pin 80 on a timing disc 82. Pin 80 moves within a slot 84 in safing member 79. Member 79 is fixed to a timing shaft (not shown). Thus, it is to be understood that the embodiments shown are illustrative only, and that many variations and modifications may be made without departing from the principles of the invention herein disclosed and defined by the appended claims.

I claim:

1. A mechanical timer fail-safe mechanism, comprising:
    means for supplying input power;
    a drive gear train;
    a speed retarding mechanism coupled to said drive gear train; and
    means coupling said input power supplying means to said drive gear train, including a limited displacement spring whereby the displacement of said spring is proportional to the retarding torque of said speed retarding mechanism.

2. A mechanical timer fail-safe mechanism in accordance with claim 1, wherein said coupling means includes a timing member coupled to said means for supplying input power and a safing member, said limited displacement spring coupling said timing member to said safing member.

3. A mechanical timer fail-safe mechanism in accordance with claim 2, wherein said timing member and said safing member each include disc portions having radial notches therein, where said notches will be aligned when a predetermined relationship exists between the driving torque and the speed retarding mechanism dissipation rate.

4. A mechanical timer fail-safe mechanism in accordance with claim 3, wherein said disc portions of said timing member and said safing member are concentric and the outside diameter of said timing member disc portion is greater than the outside diameter of said safing member disc portion.

5. A mechanical timer fail-safe mechanism in accordance with claim 4, further including an output member having an arm thereon which is prevented from providing an output until said aligned notches in said safing and timing member rotate to the position of said arm whereby said arm will enter said notches and said output member will have a motion imparted thereto.

6. A mechanical timer fail-safe mechanism in accordance with claim 4, wherein said disc portion of said timing member includes a pin at the upper surface thereof and said disc portion of said safing member includes a circumferential slot therein, said pin arranged to move in aid slot with said limited displacement spring also positioned in said slot adjacent said pin.

7. A mechanical timer fail-safe mechanism in accordance with claim 4, wherein said disc portion of said timing member includes a pin at the upper surface thereof and said disc portion of said safing member including a circumferential slot therein, said pin arranged to move in said slot with said limited displacement spring coupled to said pin and to said timing member.

* * * * *